US 008103104B2

(12) United States Patent
Fan (10) Patent No.: US 8,103,104 B2
(45) Date of Patent: Jan. 24, 2012

(54) TEXT EXTRACTION AND ITS APPLICATION TO COMPOUND DOCUMENT IMAGE COMPRESSION

(75) Inventor: Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2091 days.

(21) Appl. No.: 10/044,558

(22) Filed: Jan. 11, 2002

(65) Prior Publication Data

US 2003/0133612 A1 Jul. 17, 2003

(51) Int. Cl.
*G06K 9/48* (2006.01)
*G06K 9/62* (2006.01)

(52) U.S. Cl. .................. 382/199; 382/176; 382/224

(58) Field of Classification Search .......... 382/176, 382/199, 202, 224; 358/462
See application file for complete search history.

(56) References Cited

U.S. PATENT DOCUMENTS

| | | | | |
|---|---|---|---|---|
| 4,821,336 A | * | 4/1989 | Roye | 382/245 |
| 4,896,364 A | * | 1/1990 | Lohscheller | 382/162 |
| 5,583,659 A | * | 12/1996 | Lee et al. | 358/3.13 |
| 5,596,655 A | | 1/1997 | Lopez | |
| 5,680,479 A | * | 10/1997 | Wang et al. | 382/176 |
| 5,767,978 A | * | 6/1998 | Revankar et al. | 358/296 |
| 5,949,555 A | * | 9/1999 | Sakai et al. | 358/462 |
| 5,974,197 A | * | 10/1999 | Lee et al. | 382/268 |
| 6,160,913 A | * | 12/2000 | Lee et al. | 382/176 |
| 6,246,794 B1 | * | 6/2001 | Kagehiro et al. | 382/185 |
| 6,268,935 B1 | | 7/2001 | Kingetsu et al. | |
| 6,307,962 B1 | * | 10/2001 | Parker et al. | 382/170 |
| 6,406,062 B1 | * | 6/2002 | Brooks et al. | 283/92 |
| 6,470,094 B1 | * | 10/2002 | Lienhart et al. | 382/176 |
| 6,757,081 B1 | * | 6/2004 | Fan et al. | 358/474 |
| 6,868,183 B1 | * | 3/2005 | Kodaira et al. | 382/203 |
| 2003/0081836 A1 | * | 5/2003 | Averbuch et al. | 382/199 |

FOREIGN PATENT DOCUMENTS

| | | |
|---|---|---|
| EP | 0821318 | 1/1998 |
| JP | 2000050109 A * | 2/2000 |

OTHER PUBLICATIONS

Park et al. "An Edge-Based Block Segmentation and Classification for Document Analysis with Automatic Character String Extraction." IEEE Int. Conf. on Systems, Man, and Cybernetics, vol. 1, Oct. 14, 1996, pp. 707-712.*
"Studio Encoding Parameter of Digital Televsion for Standard 4:3 and Wide-Screen 16:9 Aspect Ratios." ITU-R Reccomendation BT.601-5. Geneva. (1995) pp. 1-16.
Gonzalez. Rafael C. and Paul Wintz. "Digital Image Processing," Second Edition. Addison-Wesley. Massachuchets. (1987) pp. 30-36.
Kamel, M. and Aiguo Zhao. "Extraction of Binary Character/Graphics Images from Grayscale Document Images." CVGIP: Graphical Models and Image Processing, vol. 55, No. 3. (May 1993) pp. 203-217.
Bottou, Leon et al. "High Quality Document Image Compression with "DjVu"" Journal of Eectronic Imaging, vol. 7(3). (Jul. 1998) pp. 410-425.
Adobe Systems Incorporated, PDF Reference, Second Edition. "adobe Portable Document Format, Version 1.3" Addison-Wesley, Boston (2000) pp. 257-258.
"Facsimile Coding Schemes and Coding Control Functions for Group 4 Facsimile Apparatus." ITU-T Reccomundation T.6. Geneva, (1988) pp. 1-9.

* cited by examiner

*Primary Examiner* — Brian Le (57) ABSTRACT

Disclosed are systems and methods to identify text-like pixels from an image by providing an image and classifying line segments of pixels within the image by edge-bounded averaging.

22 Claims, 8 Drawing Sheets

TEXT EXTRACTION AND ITS APPLICATION TO COMPOUND DOCUMENT IMAGE COMPRESSION

TECHNICAL FIELD

The present invention relates generally to an algorithm to automatically identify text-like pixels in a digital image.

BACKGROUND

The phrase "text extraction" means the identification of text characters and graphics from an image without prior knowledge of the underlying alphabet, text layout, font size, and/or orientation. Each pixel may be classified as text or non-text using a single bit. This may be viewed as a form of binarization.

The need for text extraction arises from many image-processing applications. Automatic Optical Character Recognition (OCR) software has been widely available to average consumers. Combined with an electronic scanner, OCR software readily provides a convenient way to convert paper documents into electronic form that can be more conveniently stored and processed. Text extraction is generally the first step in the OCR process, although it is also possible to directly extract features from gray scale images. In the application of compound document compression, after the text pixels are identified and separated from others, appropriate compression methods can be applied to them to achieve readability under a high compression ratio.

As the text extraction may be viewed as a signal detection problem, it requires a good characterization of the signal. For example, a global thresholding algorithm such as assumed image luminance distribution fits a bimodal Gaussian model. Such a model may characterize the black text characters on white background produced by the earlier binary printing techniques. If a document image can be characterized as black text on a slow-varying background, various adaptive thresholding algorithms may be more appropriate. However, as the printing techniques advance, text lying on top of complicated background has become common. For images of this type, the background can no longer be characterized as uniform or a slow-varying one. As a result, neither the global thresholding nor adaptive thresholding may be able to "extract" out the text pixels satisfactorily. More recently, many researchers proposed various techniques based on text properties such as color uniformity and stroke width. An earlier method utilized stroke width to distinguish characters from background by detecting pixels near edges using a second derivative operator and searching for a match within a stroke width distance. The issue of sensitivity to noise caused by the second derivative was later addressed by proposals of using window-based local averages.

Techniques based on the stroke width are typically aimed at extracting handwritten characters from complex background. A typical example is handwritten checks. In this case, it is reasonable to assume that the stroke width is within a small and known range. However, many types of document images with printed characters such as magazine pages normally have a wide and unknown range of font sizes that make techniques that rely on stroke width ineffective. Moreover, linear spatial averaging may affect boundary accuracy of identified characters.

Other examples of various problems associated with identifying text-like pixels in a digital image are, for example, the text may lie on top of a pictorial patch, a text block may not be rectangular and/or the luminance of the text may be darker or lighter than its surroundings. These problems make it difficult to reliably identify text-like pixels in a digital image.

Text extraction has many applications. For example, text extraction may be used in software running on a computer, where given an image file, the software compresses the file in PDF format. Another example of using text extraction is in a scanner. While a document is being scanned, the scanner compresses the document and saves it in PDF format. A third example of using text extraction is in software running on a computer, where given an image file, the software extracts the text pixels into an image and feeds the image to another OCR software program.

SUMMARY OF THE INVENTION

A preferred embodiment of the present invention provides systems and methods to identify text-like pixels from an image by providing an image and classifying line segments of pixels within the image by edge-bounded averaging.

BRIEF DESCRIPTION OF THE DRAWINGS

The present invention is shown by way of non-limitative examples in the following figures.

DETAILED DESCRIPTION

The present invention provides a systematic method to identify text-like features from images such as a digital or bitmap image. Preferred embodiments of the present invention are adapted to handle various types of text such as dark text on light background, light text on dark background, and/or text on pictorial regions, all with high accuracy in locating character boundaries.

Figure 1:
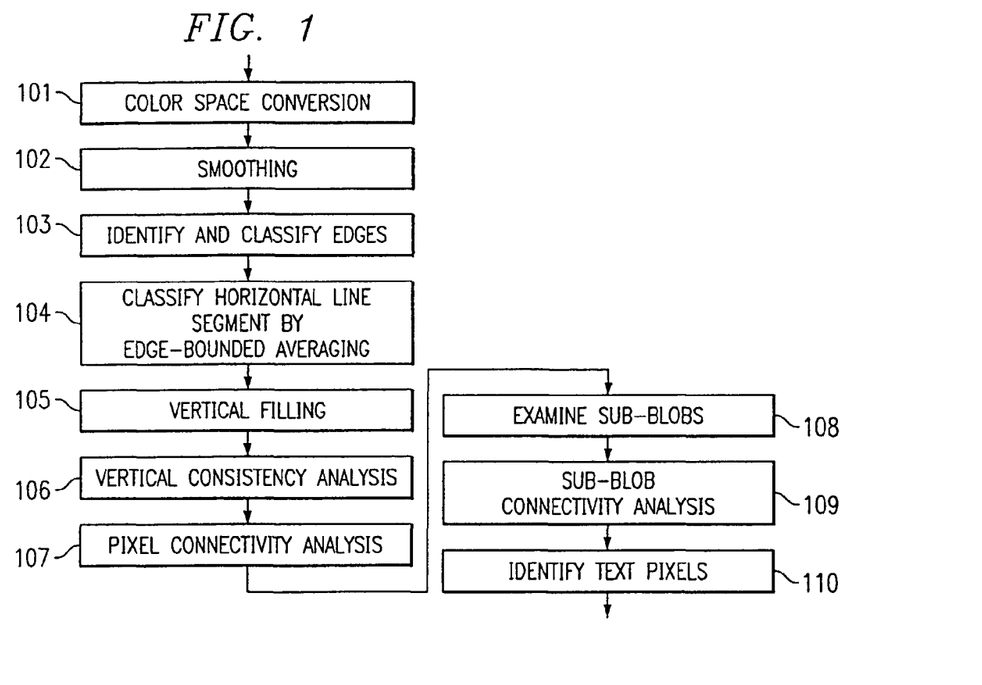
FIG. 1 is a flow diagram of a text extraction method according to a preferred embodiment of the present invention.

A preferred embodiment flowchart of operation according to an embodiment of the present invention is shown in FIG. 1. Step 101 of the preferred embodiment method illustrated in FIG. 1 provides color space conversion because the main algorithm of the preferred embodiment works on image luminance. Assuming input images are in RGB (Red, Green, Blue) color space, the RGB input data is preferably converted to a luminance/chrominance space, such as a known YCrCb space. As implemented in most image/video compression programs, the conversion can be done using a pre-calculated look-up-table to speed up the computation. Of course, where image data is input in luminance, color space conversion of step 101 may be omitted if desired.

Step 102 of the illustrated embodiment provides smoothing. Smoothing, also called low-pass filtering, is useful in eliminating some noise effects. However, smoothing may blur characters and even destroy them. Therefore, whether to apply smoothing and its parameters is preferably determined by the resolution at which the image was acquired and the minimum size of the characters the algorithm is designed to work with. Therefore, it should be appreciated that step 201 may be omitted in particular situations.

For example, no smoothing is applied to images scanned with resolution under 300 DPI (dots/inch) according to a preferred embodiment of the present invention. For images with resolutions of 300 DPI, a Gaussian lowpass filter construct may be applied to provide a requisite level of smoothing using the following formulae:

$$f_{i,j} = ke^{-\alpha^2[(i-c)^2+(j-c)^2]/c^2}$$

Where k is a normalizing factor such that $$\sum_{i,j} f_{i,j} = 1.0$$

and c is the center of the filter. According to a most preferred embodiment of the present invention, a 3×3 filter size is used and α=1.0. For images with higher resolution, a larger size (5×5, or 7×7) filter combined with the parameter α may be used. The parameter α may vary based upon the filter size to achieve a different degree of filtration of noise. In general, the larger α is for a given filter size, the smaller the degree of filtration.

Step 103 of the illustrated embodiment identifies and classifies edges within the image. In this step, every pixel is preferably classified as either NON EDGE, WHITE EDGE or BLACK EDGE. Preferred embodiment formulae for identification and classification of edges are shown below.

1. Calculate a vertical gradient $G_{i,j}^I$, a horizontal gradient $G_{i,j}^J$ and the magnitude of gradient $M_{i,j}$ using the formula, $$G_{i,j}^I = (y_{i+1,j-1} + 2y_{i+1,j} + y_{i+1,j+1}) - (y_{i-1,j-1} + 2y_{i-1,j} + y_{i-1,j+1})$$

$$G_{i,j}^J = (y_{i+1,j+1} + 2y_{i,j+1} + y_{i-1,j+1}) - (y_{i+1,j-1} + 2y_{i,j-1} + y_{i-1,j-1})$$

$$M_{i,j} = \sqrt{(G_{i,j}^I)^2 + (G_{i,j}^J)^2}$$

Where $y_{i,j}$ is the pixel luminance value at the index i,j.

2. Calculate a discrete Laplacian (a second directive) as defined below:

$$L_{i,j} = (y_{i-2,j} + y_{i+2,j} + y_{i,j-2} + y_{i,j+2}) - 4y_{i,j}$$

3. Classify every pixel as the following:

---

If $M_{i,j} > T_e$ then
    If $L_{i,j} < 0$
        Classify pixel at (i,j) as WHITE EDGE.
    Else
        Classify pixel at (i,j) as BLACK EDGE.
    Endif
Else
    Classify pixel at (i,j) as NON EDGE.
Endif

---

The preferred embodiment formula shown above uses the threshold $T_e=20$. It should be appreciated that the threshold value used above is illustrative and that other threshold values may be used such as depending upon the type of image data being analyzed or other considerations.

Figure 2:
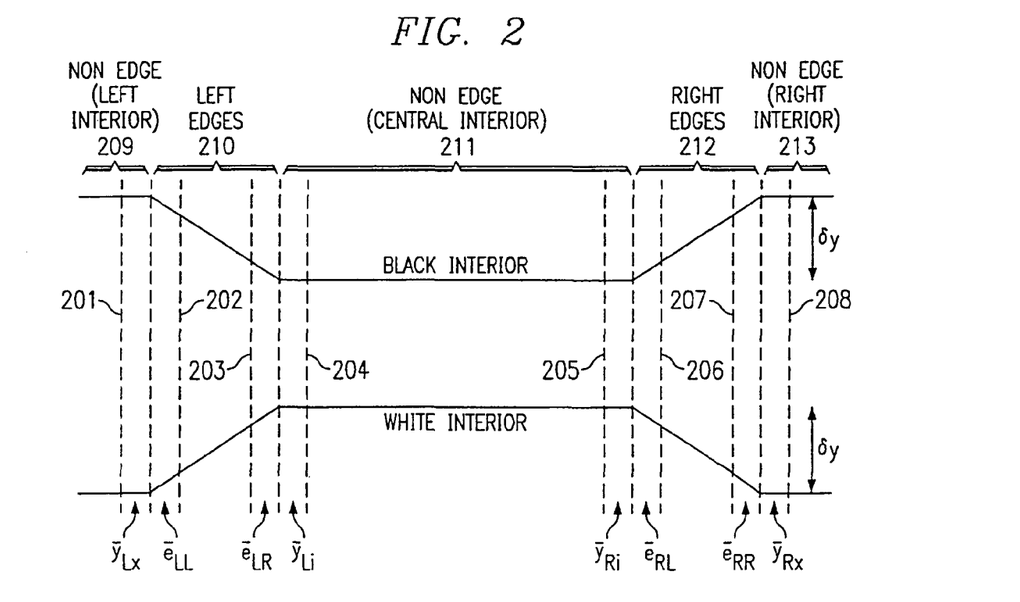
FIG. 2 is a schematic showing segments of pixels.

Step 104 of the preferred embodiment classifies horizontal line segments by an edge-bounded averaging. For example, according to a most preferred embodiment, for every horizontal line, start from the left, where j=0, and proceed to the right to identify consecutive segments of NON EDGE pixels and EDGE (including both WHITE and BLACK) pixels. Each NON EDGE segment is potentially the interior of a text character. According to a preferred embodiment, a NON EDGE segment, except at the left and right image border, is sandwiched by two edge segments, as illustrated in FIG. 2. These various segments are referred to herein as Left Interior 209, Left Edges 210, Central Interior 211, Right Edges 212 and Right Interior 213. In order to classify the segment of the Central Interior 211 according to the preferred embodiment, compute an edge-bounded averaging value at eight locations: both end points of the Central Interior 204, 205, both end points of the Left Edge segment 202, 203, both end points of the Right Edge segment 206, 207, the right end point of the Left Interior 201 and the left end point of the Right Interior 208, as illustrated in FIG. 2.

Figure 3:
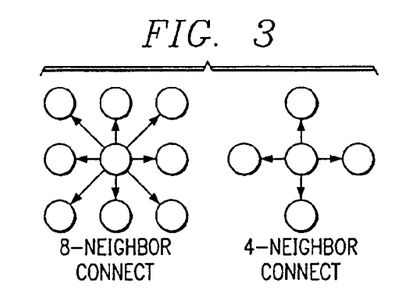
FIG. 3 is diagram showing pixel neighbor connectivity according to a preferred embodiment of the present invention.

The masks used to compute the edge-bounded averages are preferably dependent on the pixel classification of step 103 and connectivity. An edge-bounded averaging at location (i,j) may be defined as the average value of connected pixels within a mask centered at (i,j). The connectivity can be defined by both label and spatial proximity. For the edge-bounded averaging, the preferred embodiment categorizes all pixels into edges and non-edges. Both white and black edges are combined into one category of edges. A 4-neighbor connectivity for non-edge pixels and 8-neighbor connectivity for edge pixels is preferably used. The 4-neighbor and 8-neighbor connectivity systems are illustrated in FIG. 3. The size of the averaging mask is dependent on the image resolution. For example, a mask size of 7×7 may be used when the image resolution is 300 DPI and under, while a mask size of 9×9 is used for images with higher resolutions.

Figure 4:
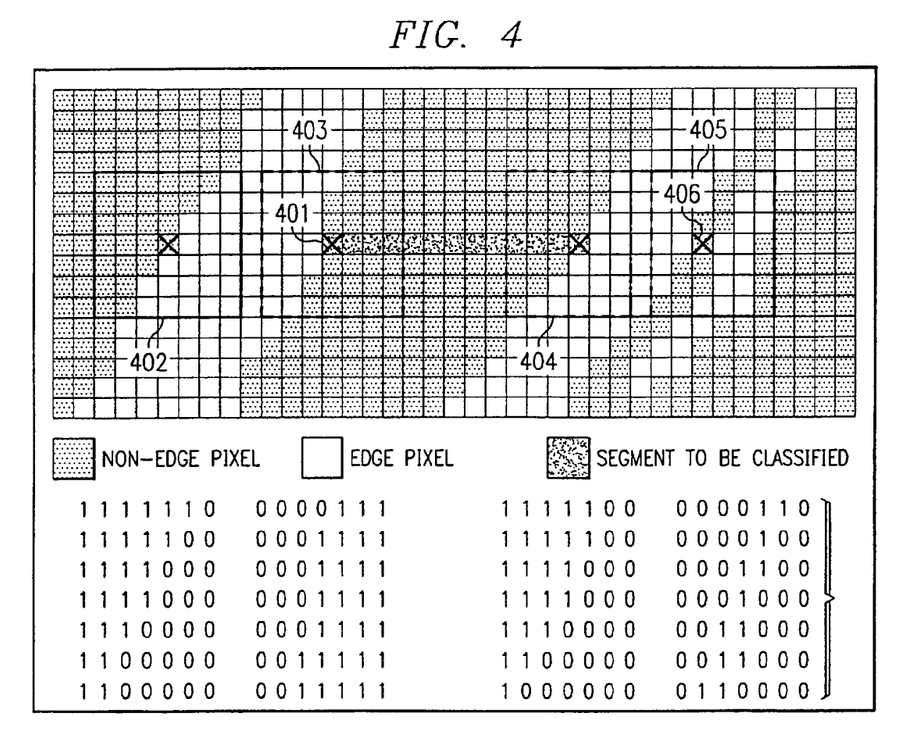
FIG. 4 is an example of a mask construction according to a preferred embodiment of the present invention.

FIG. 4 illustrates an example of mask construction for 4 of 8 locations; the 8 locations being the segments 201-208 identified in FIG. 2. For example, all non-edge pixels meeting the connectivity requirement are given a value of 1 as illustrated in FIG. 4. FIG. 4 shows four masks 402, 403, 404 and 405 according to a preferred embodiment of the present invention. Mask 405 having center reference point 406 shows that all non-edge pixels having 4-neighbor connectivity with the center pixel 406 are given a value of 1 in a preferred embodiment. All pixels having a value of 1 are preferably used for averaging. Within mask 405, in the lower right hand corner there are non-edge pixels, but because they do not have 4-neighbor connectivity with the center pixel 406 they are not assigned a value of 1 and are not used in the averaging. As another example, mask 403 may use reference point 401 for the averaging value at the left end of the gray segment. Sum up all the pixels corresponding to 1's of the mask and divide the sum by the total number of 1's. The eight averages are denoted by $\bar{y}_{Lx}$, $\bar{e}_{LL}$, $\bar{e}_{LR}$, $\bar{y}_{Li}$, $\bar{y}_{Ri}$, $\bar{e}_{RL}$, $\bar{e}_{RR}$ and $\bar{y}_{Rx}$, as illustrated in FIG. 2.

Figure 5:
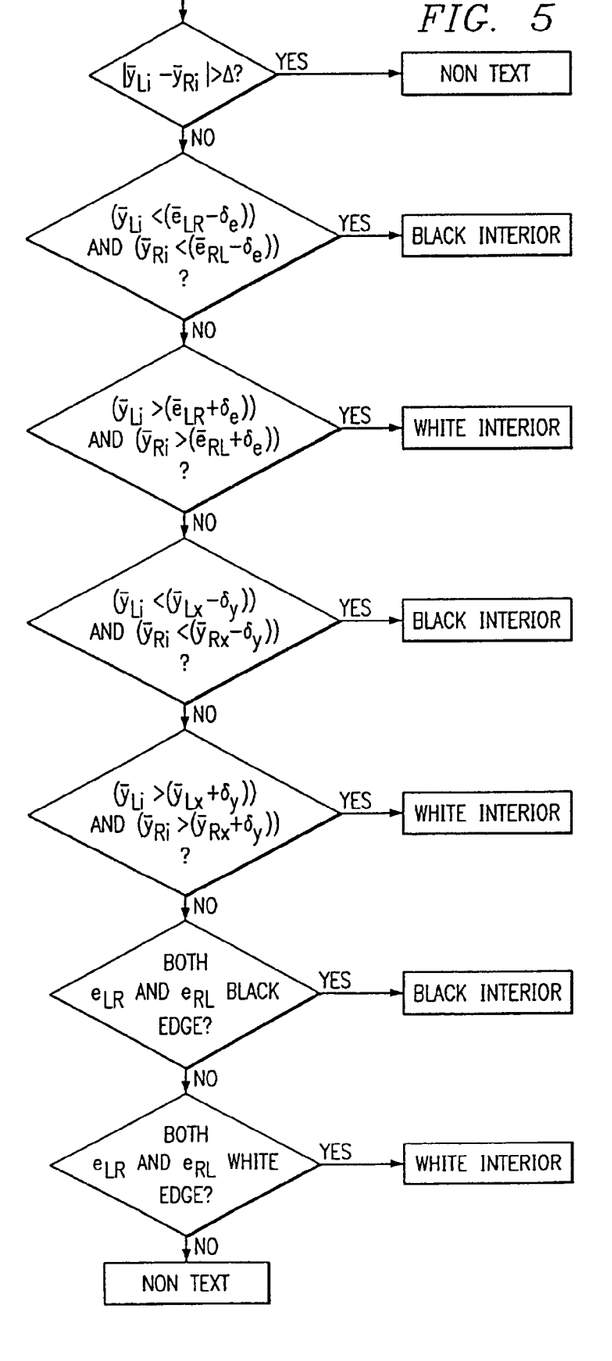
FIG. 5 is a schematic of a decision rule to classify pixels according to a preferred embodiment of the present invention.

With these eight averages, it is possible to make tentative classifications of the central interior by using decision rules, such as the preferred embodiment decision rule specified in FIG. 5. In the decision rule illustrated in FIG. 5, the parameter Δ specifies a tolerance measure for the interior uniformity and the parameters $\delta_y$ and $\delta_e$ specify minimum contrasts for characters. These parameters are preferably tied together with threshold $T_e$ such as where $\Delta=2*T_e$, $\delta_y=T_e$ and $\delta_e=0.8*T_e$. In the case of left or right borders, the comparisons with the missing averages will preferably be skipped. In the case of missing both left and right edges, the segment will preferably be classified as NON TEXT.

The preferred embodiment preferably takes vertical consistency into account. For example, for a segment tentatively classified as BLACK INTERIOR (WHITE INTERIOR), the preferred embodiment counts the number of pixels classified as WHITE INTERIOR (BLACK INTERIOR) in the previous line. If the number is larger than a preset percentage (e.g., 20%, where a higher percentile means higher tolerance) of the segment length, preferably disqualify the segment as text and assign it NON TEXT. Otherwise, the tentative classification may preferably be honored.

Step 105 of the preferred embodiment provides vertical filling. In this step, vertical segments classified as NON TEXT are preferably examined to determine whether some of them can be reclassified using the vertical filling criteria. According to the preferred embodiment vertical filling criteria, the length (referring to the number of pixels in a horizontal or vertical direction) of a segment should be less than a given number, such as for example, 2 for resolution under 300 DPI and 5 for 300 DPI. Additionally, the immediate neighbor pixels of the two ends should be compatible types according to the preferred embodiment vertical filling criteria. For example, BLACK INTERIOR and BLACK EDGE, or WHITE INTERIOR and WHITE EDGE may be identified as compatible types of neighbor pixels. Within those qualified segments, the preferred embodiment vertical filling criteria further distinguishes segments whose length is 1 and both of two end neighbors are edges of the same type of either BLACK EDGE or WHITE EDGE. For this type of segment, the segment is preferably reclassified the same type as its end neighbors. For other qualified segments, the segment is preferably reclassified as BLACK INTERIOR if its end neighbors are either BLACK INTERIOR or BLACK EDGE, and WHITE INTERIOR if its end neighbors are either WHITE INTERIOR or WHITE EDGE.

Step 106 of the illustrated method provides vertical consistency analysis. Pixels not yet classified as NON TEXT are text pixel candidates. In this step, the not yet classified pixels are preferably subjected to further scrutiny in terms of vertical consistency. Preferred embodiment vertical consistency analysis identifies all horizontal segments characterized by consecutive pixels not classified as edges (WHITE EDGE, BLACK EDGE and a new one introduced by this step, DELETED EDGE) and length longer than a given threshold such as, for example, 5. Every pixel within such a segment should be WHITE INTERIOR, BLACK INTERIOR, or NON TEXT. DELETED EDGE refers to a pixel that is an edge pixel, but it does not qualify as a text pixel.

For each of such segments, the preferred embodiment vertical consistency analysis counts the number of pixels classified as WHITE INTERIOR as $w_c$ and the number of BLACK INTERIOR as $k_c$, and analyzes vertical border inconsistency, i.e. error.

Vertical consistency analysis preferably considers two types of border inconsistency. A first type of error is due to missing edges in the border. This may include at least two cases: 1) the current pixel is WHITE INTERIOR and the above or down neighbor is BLACK INTERIOR or NON TEXT; 2) the current pixel is BLACK INTERIOR and the above or down neighbor is WHITE INTERIOR or NON TEXT. A second type of error is due to incompatible edge types, which includes at least two cases: 1) the current and above pixels are interior pixels of the same type (WHITE or BLACK INTERIOR) and the down neighbor is edge pixels of the opposite type (BLACK or WHITE EDGE); or 2) the current and down pixels are interior pixels of the same type (WHITE or BLACK INTERIOR) and the above neighbor is edge pixels of the opposite type (BLACK or WHITE EDGE). Vertical consistency analysis according to the preferred embodiment counts the maximum run length (the longest consecutive segment) $EL_1$ for the first type error alone and the maximum run length $EL_{12}$ for combined first and second type errors.

A decision is preferably made as to whether to delete or reclassify the segment and neighboring pixels. For example, if the maximum run length $EL_1$ of the first type error is larger than a parameter max_borderErr1RunLen or a given first percentile, for example 60% of the segment length, or the maximum run length $EL_{12}$ of the combined first and second type errors is larger than a second percentile, for example 80% of the segment length, the segment may be identified for deletion. If the decision is not to delete the segment and the neighboring pixels, the preferred embodiment moves on to analyze another segment. The parameter of max_borderErr1RunLen is preferably dependent on image resolution: for example 5 for resolution less than 600 DPI, and 10 for others.

For a segment identified for deletion, the preferred embodiment reclassifies all the pixels within the segment as NON TEXT. Moreover, the preferred embodiment vertical consistency analysis examines the associated neighboring (left, right, above and below) edge pixels of the segment for possible deletion, as described in the following.

If, in a first case, the length of an edge segment (a vertical or horizontal line segment of edge pixels) is longer than a specified value, for example for 300 DPI, choose 10, the edge segment will preferably not be deleted. This is to prevent the deletion of thin lines that will be counted as "text" according to the preferred embodiment for compression applications.

Otherwise, in a second case, if $w_c$ is larger than a first percentage, for example 50%, of all the pixels within the segment, the segment is preferably assumed to be a WHITE segment and the WHITE EDGE segment may be marked for deletion. In the preferred embodiment, the WHITE EDGEs are deleted until a BLACK EDGE is encountered. Else if $k_c$ is larger than a second percentage, for example 50%, of all the pixels within the segment, the segment is preferably assumed to be a BLACK segment and the BLACK EDGE may be marked for deletion. In the preferred embodiment, the BLACK EDGEs are deleted until a WHITE EDGE is encountered. Otherwise the majority of the pixels within the segment are preferably not classified as text pixels and what type of edge to be deleted should be determined.

If the above is not satisfied then, in a third case, the edge-bounded averaging approach detailed in the step 104 may be used to determine the type of edge to be deleted. However, reverse logic of FIG. 4, preferably and applied to one side only, is used in determining edge types to be deleted according to the preferred embodiment. For example, the following rule may be used to determine the edge type to delete from the left end.

if $(\bar{y}_{Li} < (\bar{e}_{LR} - \delta_e))$
    Delete edge = BLACK EDGE;
Else If $(\bar{y}_{Li} > (\bar{e}_{LR} + \delta_e))$
    Delete edge = WHITE EDGE;
Else If $(\bar{y}_{Li} < (\bar{y}_{Lx} - \delta_y))$
    Delete edge = BLACK EDGE;

```
Else if ($\bar{y}_{Li} > (\bar{y}_{Lx} + \delta_y)$)
    Delete edge = WHITE EDGE;
Else
    Not to delete edge;
```

Therefore, all three cases are preferably analyzed in particular situations. If the decision is to delete edges from the left edges, the preferred embodiment starts from the right end of the left edges and move towards the left, deleting pixels, until a different type pixel is encountered. A similar approach is preferably applied to the right end. The deletion is accomplished according to a preferred embodiment by reclassifying edge pixels into a new label "DELETED EDGE" since they are still preferably to be counted as edges for the operation of the edge-bounded averaging.

Preferred embodiments also consider edges above and below the segment for deletion. For example, if a pixel's above (or below) neighbor is an edge pixel, the present invention may operate to trace it upwards (or downwards), up to a distance such is, for example, for 300 DPI the distance may be chosen to be 10. The same method is preferably applied in marking such pixels for deletion as for the horizontal directions described above.

Step 107 of the illustrated embodiment provides pixel connectivity analysis. In this step, the preferred embodiment identifies aggregates of pixels that have been identified as candidates for text and collects their statistics at the same time. The aggregate is called a sub-blob. Two pixels belong to the same sub-blob according to a preferred embodiment if they are 8-neighbor connected, and they are labeled as the same category BLACK (EDGE or INTERIOR) or WHITE (EDGE or INTERIOR). For example, in the raster scan mode, the preferred embodiment may start from the left side with j=0 and proceed to the right and identify all horizontal segments characterized by consecutive pixels of the same category (BLACK EDGE and BLACK INTERIOR, WHITE EDGE and WHITE INTERIOR). Then, the preferred embodiment may check the previous line to see if there is any connection. At the same time, the following statistics for each sub-blob are preferably collected: total number of pixels, sums of color values (Y, Cr, Cb independently), number of border pixels, number of broken border pixels and horizontal run length. The horizontal run length is the length of the segment.

In the preferred embodiment, a border pixel is made of EDGE pixels, either WHITE EDGE or BLACK EDGE. If a WHITE INTERIOR pixel directly touches a BLACK INTERIOR pixel, or a BLACK INTERIOR pixel directly touches a WHITE INTERIOR pixel, or either a WHITE INTERIOR or a BLACK INTERIOR pixel touches a NON-TEXT pixel, the pixel is called a missing border.

In the preferred embodiment, a broken border pixel is when the current pixel is a BLACK (or WHITE) INTERIOR and one of its neighbors is WHITE (or BLACK) INTERIOR or NON TEXT. Sub-blobs can be distinguished by at least two types. For example, black sub-blob comprises pixels of BLACK INTERIOR and BLACK EDGE, and white sub-blob comprises pixels of WHITE INTERIOR and WHITE EDGE.

Step 108 of the illustrated embodiment examines sub-blobs. With the information collected about each sub-blob during the pixel connectivity analysis, further discrimination can be performed on the sub-blobs.

If the total number of pixels is less than a given threshold minSubSize (dependent on the resolution and the minimum font size), the sub-blob is preferably marked as NON TEXT. For example, minSubSize may equal 3 for resolutions less than 300 DPI, 6 for 300 DPI, and 12 for over 300 DPI.

If the number of total broken border is larger than a parameter maxNoBorderPixels (dependent on image resolution), the sub-blob is preferably marked as NON TEXT. For example, maxNoBorderPixels may equal 10 for less than 300 DPI, 15 for 300 DPI and 30 for above 300 DPI.

If the border count is larger than a value, for example 5, and the ratio of broken border count over total border count is larger than a given threshold maxBrokenBorderRatio, for example 0.2, the sub-blob is preferably marked as NON TEXT.

If the total number of the current sub-blob is less than a threshold, for example 7*minSubSize, the preferred embodiment looks for another sub-blob of the same type (black or white) and with a pixel count, for example at least 70%, of the current sub-blob within a "context window" of a specified size (dependent on the resolution) centered in the current pixel location. For example, a context window 21×21 may be used for less than 300 DPI, and a context window 29×29 may be used for 300 DPI. If no such a sub-blob is found, the sub-blob is preferably marked as NON TEXT.

Step 109 of the illustrated embodiment provides sub-blob connectivity analysis. In this step, 8-neighbor connected sub-blobs not marked with NON TEXT will preferably be grouped into blobs. The connectivity of sub-blobs is preferably the same as for the pixels. That is, two sub-blobs, regardless of whether they are white sub-blobs or black sub-blobs, are connected if they share at least one 8-connected pixel pair. There is no constraint on the number and topological arrangement of sub-blobs within one blob according to the preferred embodiment. The following statistics for each blob are preferably collected: the number of outer border pixels and the number of inner sub-blobs. An outer border pixel is a pixel belonging to the blob and is neighbored to a NON TEXT pixel. An inner sub-blob is a sub-blob belonging to the blob and does not connect to any pixel that does not belong to the blob.

Figure 6:
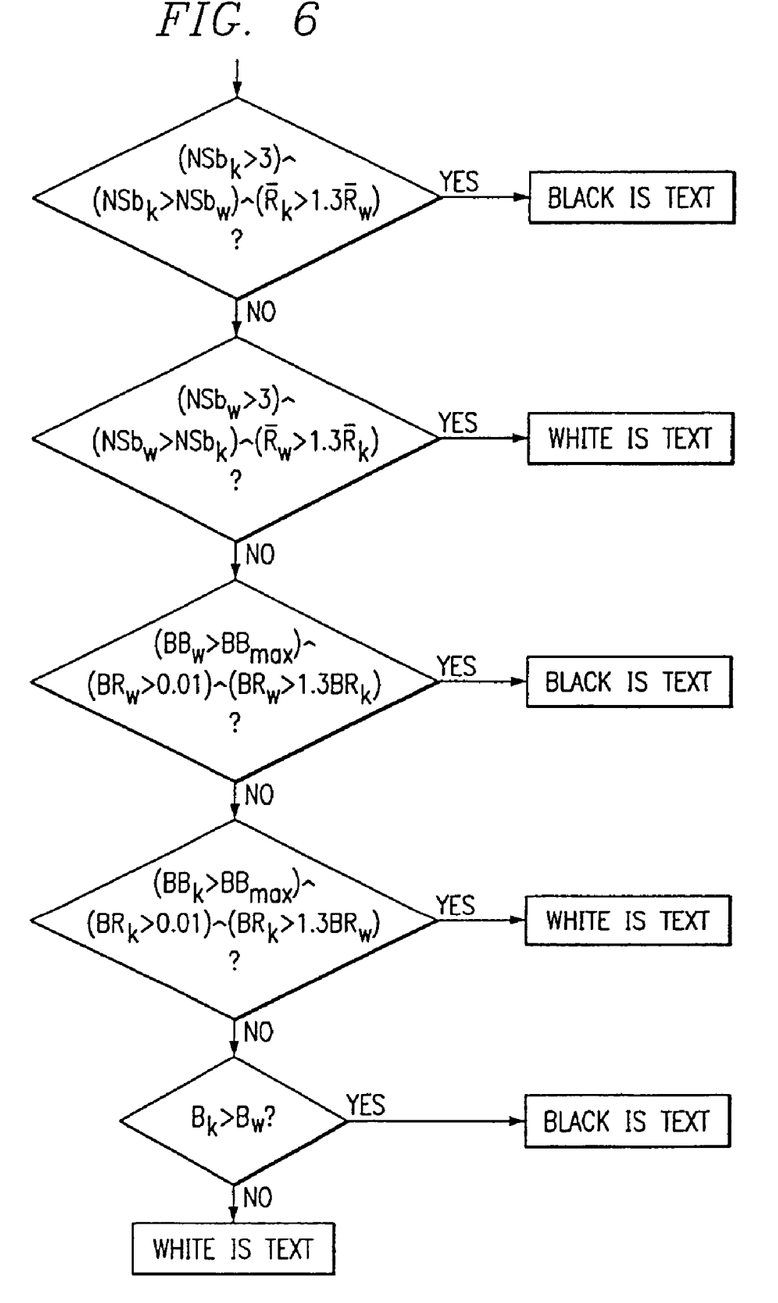
FIG. 6 is a schematic of a decision rule to classify pixels according to a preferred embodiment of the present invention.

Step 110 of the illustrated embodiment identifies text pixels. A complex document image may include dark characters on light background, light characters on dark background and/or characters on top of pictorial regions. Correspondingly, a blob may contain both black and white sub-blobs. In order to identify text pixels, the preferred embodiment of the present invention determines which type (black or white) of sub-blob is text. See FIG. 6 for a preferred embodiment decision rule for use in determining what type of sub-blob is text, where $\bar{R}$ stands for the mean run length, NSb for the number of inner sub-blobs, BB for the broken border count, B for the border pixel count, and BR for the broken border ratio (BR=BB/B), with subscript w for white and k for black.

Figure 7:
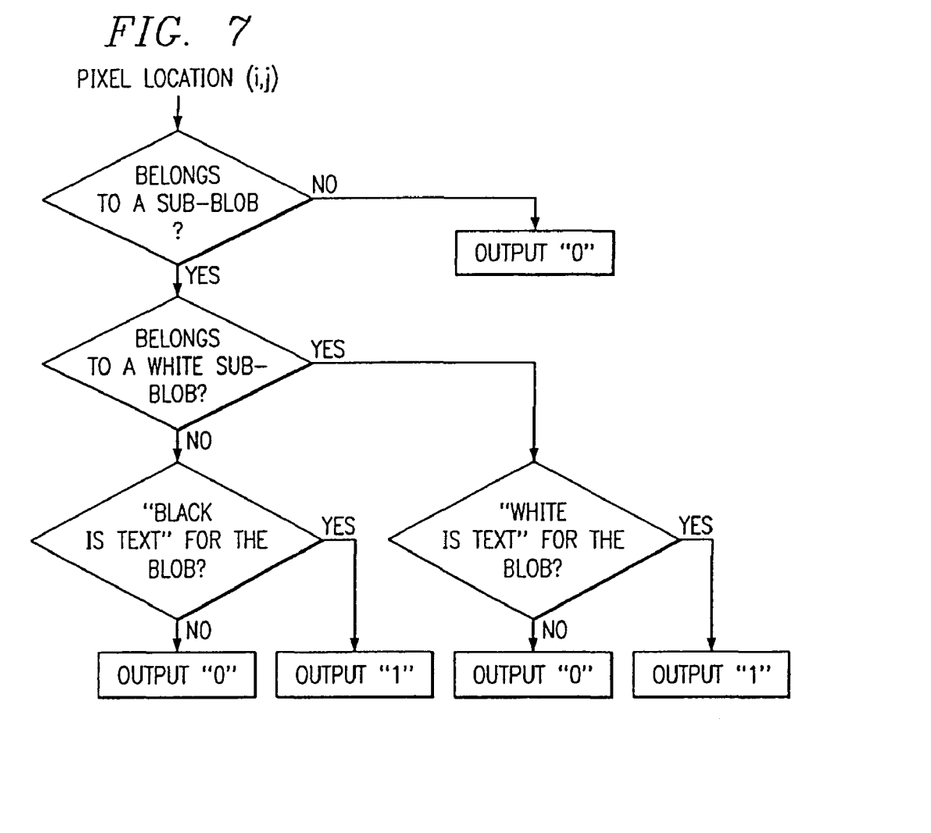
FIG. 7 is a schematic of a decision rule to output pixels according to a preferred embodiment of the present invention.

The preferred embodiment classifies all pixels within an image as text and non-text using a binary notation, e.g. where: a bit 1 represents a text pixel, and a bit 0 represents a non-text pixel. The logic for the final classification according to a preferred embodiment is shown in FIG. 7. Alternatively, bit 0 may be used to represent a text pixel and bit 1 to represent a non-text pixel.

A preferred embodiment application of the present invention provides compound document compression. Compound document images are images containing mixtures of text characters, line drawings, and continuous toned pictorial regions. Uniformly applying any single image compression scheme to a whole image in general would not achieve the optimum result of high compression ratio and image quality. Recently, new methods have been developed that separate distinct components of a compound document image and apply different compression methods to them to achieve joint high compression ratio and image quality. One known method creates three images (foreground/background/mask) from a compound document image and applies different compression methods to each of them. However, this method requires a special file format to support its compression method and requires a special viewer for displaying and printing.

In contrast to the above mentioned creation of these images, application of preferred embodiments of the present invention provides extraction of text from a compound document. Accordingly, compression methods disclosed by the present invention are compatible with the Adobe PDF file format and therefore, the compressed files may be utilized with a PDF viewer for viewing and printing.

Two illustrative compression methods have been devised to be compatible with PDF References 1.2 and 1.3 utilizing preferred embodiment text extraction techniques. Specifically, a two-layer compound document image compression scheme, as shown below, may utilize text extraction according to the present invention and provide compatibility with PDF Reference 1.2. Similarly, a three-layer compound document image compression scheme, also as shown below, may utilize text extraction according to the present invention and provide compatibility with PDF Reference 1.3. Like the prior art, the present invention also separates the image into two or three layers. However, preferred embodiments of the present invention enable the layers to be viewed using a single PDF viewer and are compatible with a single file type, Adobe PDF.

Figure 9:
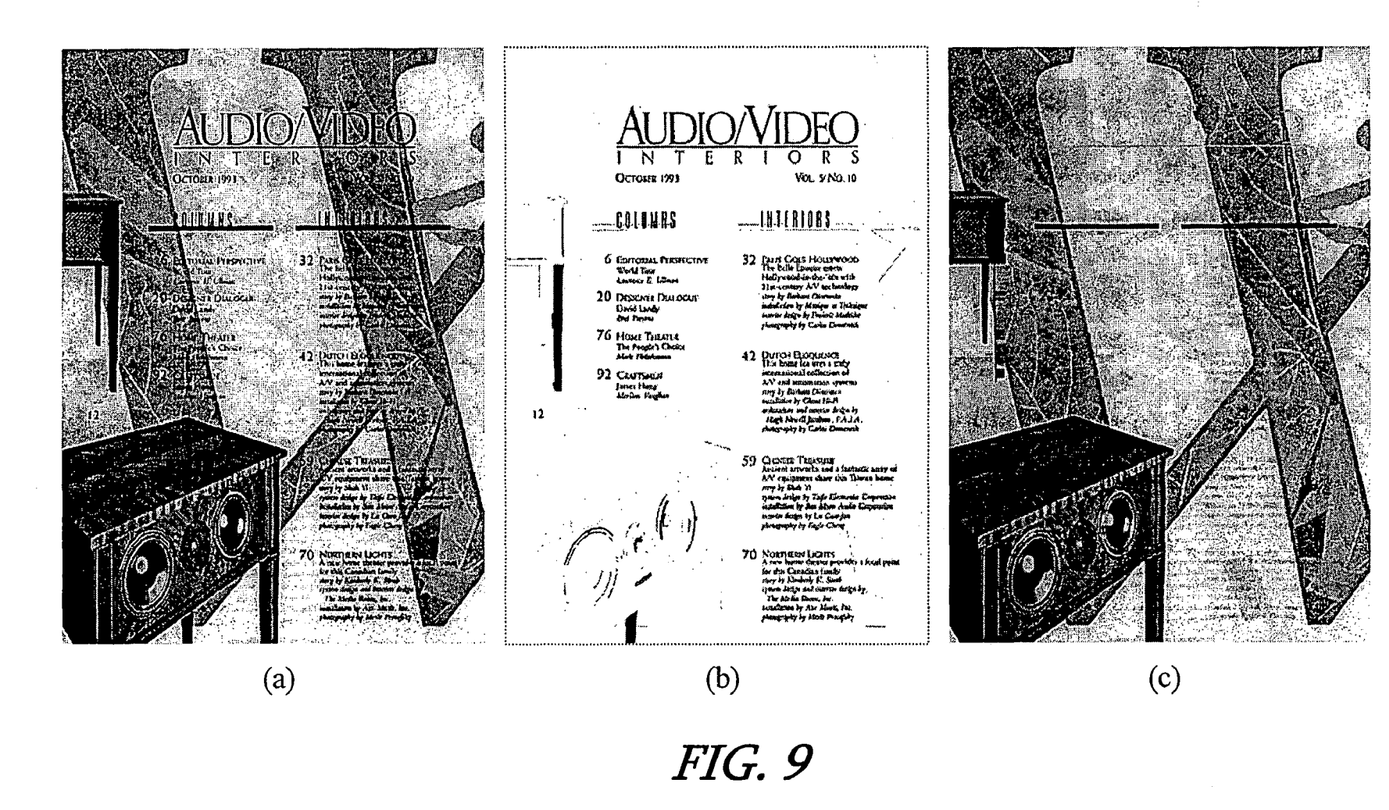
FIG. 9 is an example of layer separation according to a preferred embodiment of the present invention.

Directing attention to FIG. 9, a preferred embodiment two-layer compound document image compression scheme compatible with PDF Reference 1.2 is shown. According to the compression scheme, as FIG. 9 illustrates, two images are preferably generated from an input document image 901. The first image preferably being a binary image 902 with the pixel value 0 corresponding to text pixel of a pre-selected color range, and the pixel value 1 corresponding to anything else. This layer is referred to herein as the mask layer. The second image preferably being a color image 903 containing all non-text pixels and adaptively filled pixel locations occupied by text pixels. It is also called the background layer.

Using a modified version of the text extraction algorithm for generating the binary image, the preferred embodiment executes steps 101 to 108 of the general text extraction procedure. However, step 107 of the general algorithm described above is preferably modified to include two counters for sums of luminance and chroma values for each sub-blob. When a new pixel is added to the sub-blob, its luminance and chroma values are calculated. According to this illustrative embodiment, the luminance value is the Y value and the chroma value is $C=\sqrt{(C_r-128)^2+(C_b-128)^2}$. Then, for edge pixels, 0.75*Y and 0.5*C are preferably added into the counters, and for non-edge pixels, Y and C are preferably added.

After operation of the above steps, the illustrative embodiment of the compound document compression scheme preferably outputs a binary image. For each black sub-blob, the preferred embodiment scheme preferably computes the mean luminance (equals to the luminance sum divided by the total number of pixels) and the mean chroma (equals to the chroma sum divided by the total number of pixels) values. If the mean luminance and chroma are within specified ranges, the sub-blob is preferably classified as text and all the pixels be long to it will have an output value 0. All other pixels will preferably have an output value 1. For example, $\bar{Y}<20$, or $(20\leq \bar{Y}<180)\hat{0}(\bar{C}<18)$, where $\bar{Y}$ stands for the mean luminance and $\bar{C}$ stands for the mean chroma. The colors within this range are generally perceived as black.

Once the binary image is determined, part of the color image is also determined. That is, all the non-text pixels should belong to the color image. Then, the problem is how to fill the holes left by the text pixels. In order to make the color image as smooth as possible for higher compression ratio and less compression artifacts, a line-based adaptive filling algorithm is preferably utilized.

A preferred embodiment line-based adaptive filling algorithm is set forth in the steps below. First, the preferred embodiment line-based adaptive filling algorithm starts from the first pixel (index j=0) of the line and sets $j_0=0$.

Second, the preferred embodiment line-based adaptive filling algorithm searches towards the last pixel (index j=image width−1) until a pixel identified as text is found and remembers the location as $j_L$.

Third, the preferred embodiment line-based adaptive filling algorithm searches towards the last pixel (index j=image width−1) until a pixel identified as non-text is found and the space between this index and the next text pixel is at least spD (for example, for 300 DPI resolution, we chose 3) and remembers the location as $j_R$.

Figure 8:
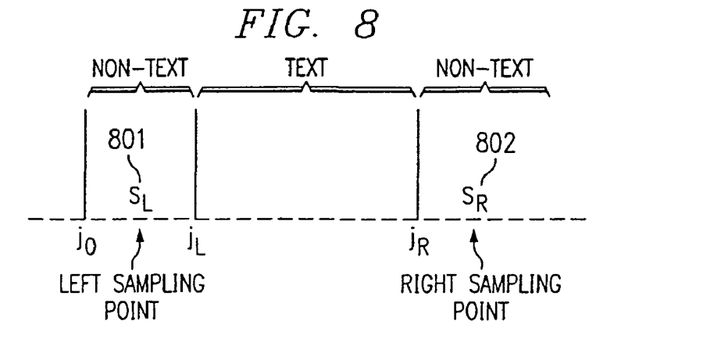
FIG. 8 illustrates sampling points for adaptive filling according to a preferred embodiment of the present invention.

Fourth, the preferred embodiment line-based adaptive filling algorithm determines the left and right sampling points. As demonstrated in FIG. 8, the sampling points are pulled away from the two boundary points of the text segment. The left sampling point $s_L$ 801 is spD or $(j_L-j_0)/2$, whichever is smaller. The right sampling point $s_R$ 802 is spD or $(width-1-j_R)/2$, whichever is smaller.

Fifth, the preferred embodiment line-based adaptive filling algorithm takes values Y, $C_r$, $C_b$ at the two sampling points and linearly interpolates them on all the text pixel locations. For example, for location j within the range $j_L \leq j \leq j_R$, the interpolated value is $x(j)=x(s_L)+(j-s_L) \cdot (x(s_R)-x(s_L))/(s_R-s_L)$, where x stands for Y, $C_r$ and $C_b$, respectively.

Sixth, if the right end of the image border is reached, the preferred embodiment line-based adaptive filling algorithm stops. Otherwise, it sets $j_0=j_R+1$, and goes back to the second step.

The above procedure is preferably applied to all image lines (rows). An example of such two images generated from a compound document image is shown in FIG. 9.

In order to further compress the color image, which generally contains smooth regions of pictorial components and color patches, its resolution may be reduced by a factor N (in a preferred embodiment 2 is chosen) sub-sampling. A simple method of sub-sampling is averaging. For example, for every N by N square block of pixels, a preferred embodiment may output one pixel with values equal to the averaging of the N by N block.

A known lossless compression method, such as CCITT/ITU-T Group 4, may be applied to the binary mask layer, and a lossy compression method, such as JPEG, may be applied to the background layer converted back to RGB color space. PDF Reference 1.2 supports both compression methods to specify the mask layer for the correct interpretation by the PDF viewer. A known feature called stencil masking is utilized within the preferred embodiment.

Figure 11:
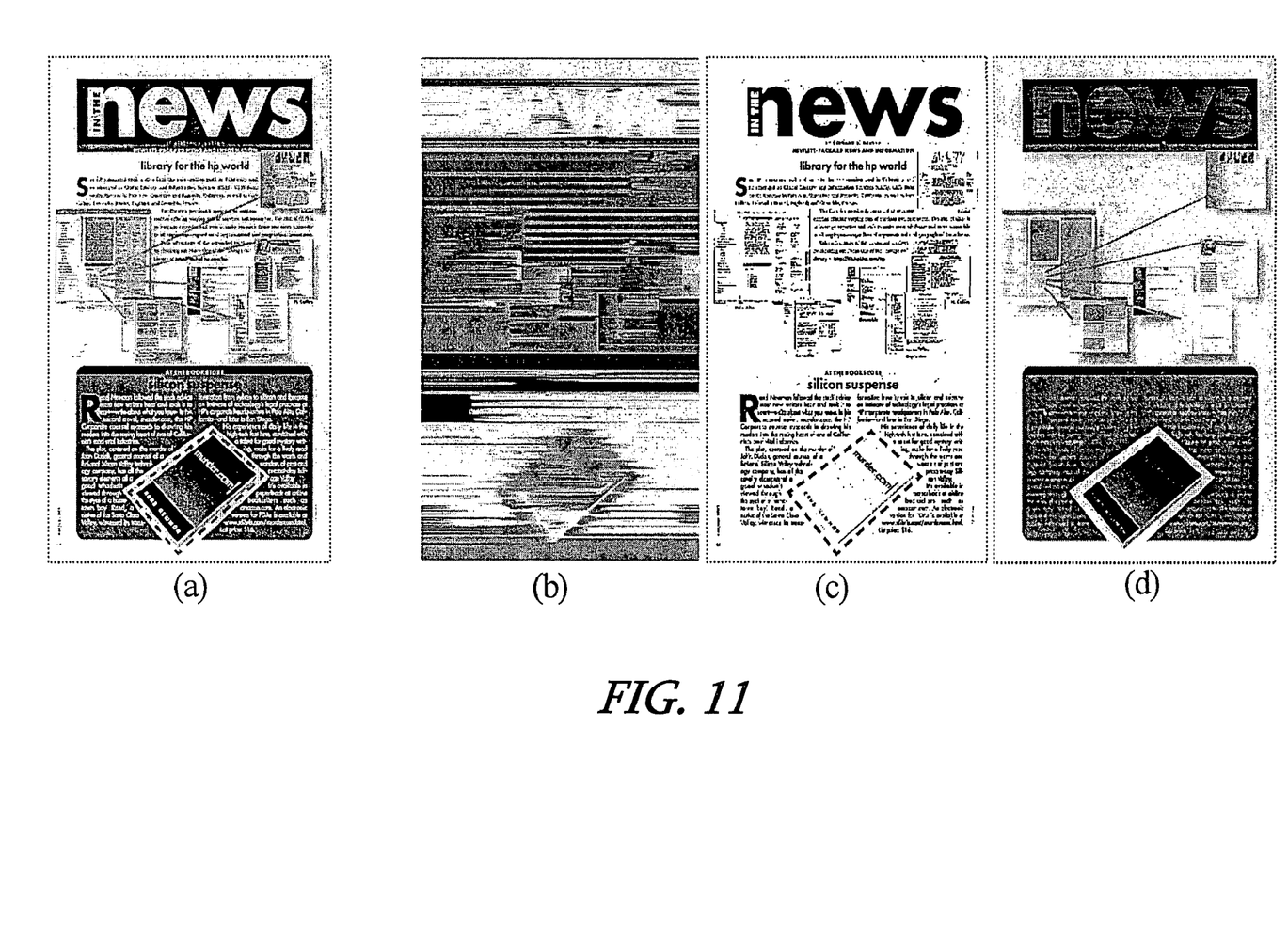
FIG. 11 is an example of layer separation according to a preferred embodiment of the present invention.

With reference to FIG. 11, a preferred embodiment three-layer compound document image compression scheme compatible with PDF Reference 1.3 will be described. A disadvantage of the two-layer compression method is that it can generally put text of a single color into the binary layer to be rendered correctly. Text with any other color will be put on the color image layer and their quality and legibility will likely be significantly compromised.

Generally three layers are desirable for including text of all colors in the binary layer. FIG. 11 is an original image 1101 broken down into a foreground layer 1102, a mask layer 1103 and a background layer 1104. The extra color layer is utilized for the colors of text and is referred to herein as the foreground. Although the present invention, like the prior art, breaks the image into three layers, preferred embodiments of the present invention enable the layers to be viewed using a single PDF viewer and are compatible with a single file type, Adobe PDF.

For identifying all text pixels for the mask layer, the preferred embodiment compound document compression scheme applies the complete procedure as detailed in steps 101-110. However, the pixel connectivity analysis of step 107 is preferably modified to include three counters for sums of Y, $C_r$, $C_b$ for each sub-blob. When a new pixel is added to the sub-blob, values corresponding to its Y, $C_r$, $C_b$ values are preferably added to the respective counters in this way: for black edge pixels, 0.7*Y, $C_r$, $C_b$ are added, and for white edge pixels, 1.2*Y (if 1.2*Y>255, 255), $C_r$, $C_b$ are added. This will enhance the contrast of text.

Figure 10:
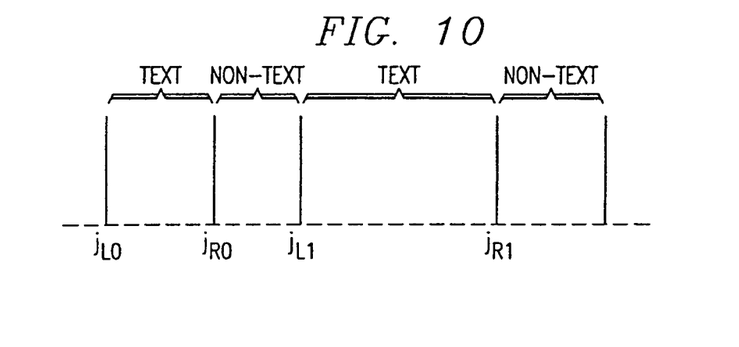
FIG. 10 illustrates filling according to a preferred embodiment of the present invention.

The mask and background layers are preferably generated in the same way as detailed in the method for the two-layer method. To generate the foreground layer in the raster scan order, a line-based filling method is preferably used. Referring to FIG. 10, the steps of a preferred embodiment line-based filling method are set forth below.

First, the preferred embodiment line-based filling method starts from the first pixel (index j=0) of the line and sets $j_{L0}=-1, j_{R0}=-1$.

Second, the preferred embodiment line-based filling method searches towards the last pixel until a text segment is found or the end is reached.

Third, if a text segment is found, it must belong to a sub-blob. The preferred embodiment line-based filling method lets $[j_{L1}, j_{R1}]$ be the interval of the text segment and obtains the mean values $Y_1, \overline{C}_{r1}, \overline{C}_{b1}$ of the sub-blob and uses them to fill the interval $[j_{L1}, j_{R1}]$ of the foreground layer. If this is not the first text segment ($j_{R0}>0$), the preferred embodiment line-based filling method fills the interval $[j_{R0}, j_{L1}]$ of the foreground layer by linear interpolating (in the same manner as described before) the two sets of colors $Y_1, \overline{C}_{r1}, \overline{C}_{b1}$ and $Y_0$, $\overline{C}_{r0}, \overline{C}_{b0}$ (of the previous text segment $[j_{L0}, j_{R0}]$). If this is the first text segment and $j_{L1}>0$, the preferred embodiment line-based filling method fills the interval $[0, j_{L1}]$ of the foreground layer with $Y_1, \overline{C}_{r1}, \overline{C}_{b1}$. Update $j_{L0}=j_{L1}, j_{R0}=j_{R1}, Y_0=Y_1, \overline{C}_{r0}=\overline{C}_{r1}, \overline{C}_{b0}=\overline{C}_{b1}$.

Fourth, if this is not the end of the line, the preferred embodiment Line-based filling method goes back to the second step.

If this is the end of the line,
- If $j_{R0}>0$ and the last text segment does not extent to the end (the case of the text segment extends to the end is covered by the second step), the preferred embodiment line-based filling method fills the interval $[j_{R0},$ end$]$ of the foreground layer with $Y_0, \overline{C}_{r0}, \overline{C}_{b0}$.
- If $j_{R0}<0$ (this means there is not a single text segment found for this line) and this is not the first line, the preferred embodiment line-based filling method copies the previous line of the foreground layer to this line. If this is the first line, the preferred embodiment line-based filling method assigns values 128, 128, 128 (the middle value in the range of [0,255]) to the line.

The preferred embodiment line-based filling method then copies this line of the foreground layer to a buffer.

For an efficient implementation, the generating of both background and foreground layers can be done in a single procedure.

FIG. 11 shows an example of the three layers generated from a compound document image. In order to achieve high compression ratio, 2 by 2 sub-sampling is preferably applied to the background layer and 4 by 4 sub-sampling is preferably applied to the foreground layer. Higher sub-sampling factors may be chosen to achieve higher compression-ratio but the quality may be further compromised.

A known lossless compression method, such as CCITT/ITU-T Group 4, is preferably applied to the binary mask layer, and a lossy compression method, such as JPEG, is preferably applied to both the background and foreground layers, both converted back to RGB color space. It should be appreciated that the PDF Reference 1.3 supports both compression methods. The preferred embodiment utilizes a known feature called masking by an image to specify the mask layer for the correct interpretation by the PDF viewer. The background is preferably drawn first, followed by the mask layer and lastly, the foreground layer.

When implemented via executable instructions, various elements of the present invention are in essence the code defining the operations of such various elements. The executable instructions or code may be obtained from a readable medium (e.g., hard drive media, optical media, EPROM, EEPROM, tape media, cartridge media, and/or the like) or communicated via a data signal from a communication medium (e.g., the Internet). In fact, readable media can include any medium that can store or transfer information.

Figure 12:
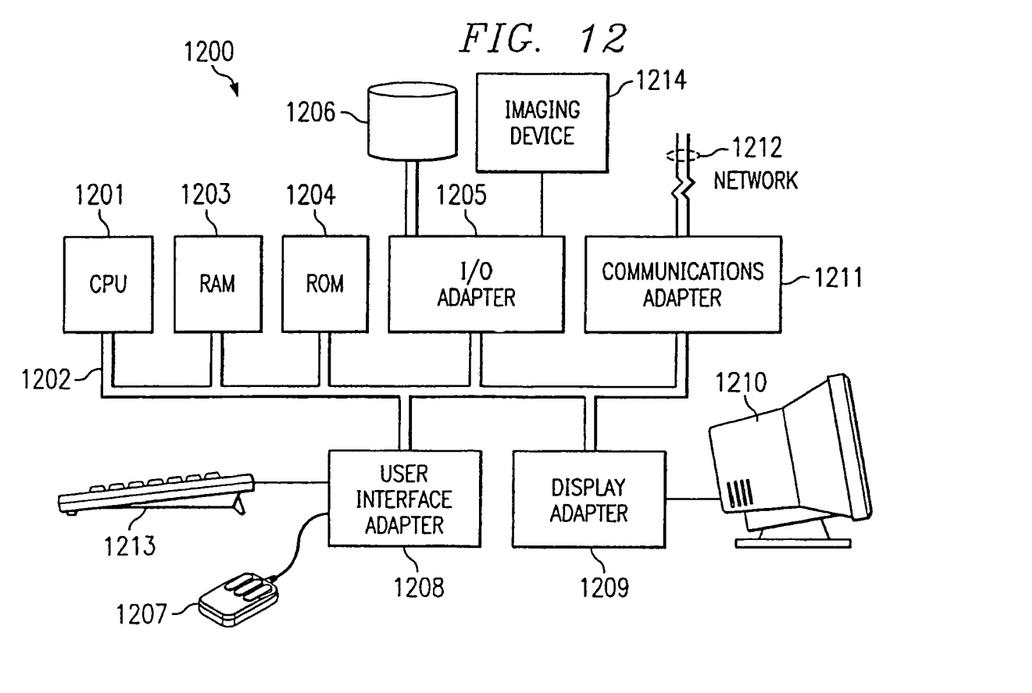
FIG. 12 depicts a block diagram of a computer system which is adapted to use the present invention.

FIG. 12 illustrates computer system 1200 adapted according to embodiments of the present invention. Central Processing Unit (CPU) 1201 is coupled to system bus 1202. CPU 1201 may be any general purpose CPU. However, the present invention is not restricted by the architecture of CPU 1201 as long as CPU 1201 supports the inventive operations as described herein.

Computer system 1200 also includes random access memory (RAM) 1203, which may be SRAM, DRAM, SDRAM, or the like. Computer system 1200 includes ROM 1204 which may be PROM, EPROM, EEPROM, or the like. RAM 1203 and ROM 1204 hold user and system data and programs as is well known in the art. A preferred embodiment of the present invention stores the algorithms defining the operation in the memory and the processor executes the algorithms to accomplish the text extraction disclosed herein.

Computer system 1200 also includes input/output (I/O) adapter 1205, communications adapter 1211, user interface adapter 1208, and display adapter 1209. I/O adapter 1205 connects to storage devices 1206, such as one or more of hard drive, CD drive, floppy disk drive, tape drive, to computer system 1200. I/O adapter 1205 may also connect to an imaging device 1214, such as a scanner or a digital camera. Communications adapter 1211 is adapted to couple computer system 1200 to a network 1212, which may be one or more of telephone network, local (LAN) and/or wide-area (WAN) network, Ethernet network, and/or Internet network. User interface adapter 1208 couples user input devices, such as keyboard 1213 and pointing device 1207, to computer system 1200. Display adapter 1209 is driven by CPU 1201 to control the display on display device 1210.

What is claimed is:

1. A method to identify text-like pixels from an image, the method comprising:
   classifying a plurality of individual pixels within a mask within the image as either edge or non-edge, wherein a pixel (i,j) is located at the center of the mask;

determining whether the pixel (i,j) is an edge pixel or a non-edge pixel;

determining pixels in the mask having connectivity with the pixel (i,j);

for each pixel in the mask determined to have connectivity with the pixel (i,j), determining whether the pixel is an edge pixel or a non-edge pixel; and performing, by a computer, edge-bounded averaging to determine line segments, wherein the edge-bounded averaging comprises one of in response to determining that pixel (i,j) is an edge pixel, identifying all pixels in the mask that are edge pixels and that have connectivity with the pixel (i,j) from the determining of whether each pixel having connectivity is an edge pixel or a non-edge pixel, and determining an average value of only all the identified edge pixels in the mask having connectivity with the pixel (i,j), or in response to determining that pixel (i,j) is a non-edge pixel, identifying all pixels in the mask that are non-edge pixels and that have connectivity with the pixel (i,j) from the determining of whether each pixel having connectivity is an edge pixel or a non-edge pixel, and determining an average value of only all the identified non-edge pixels in the mask having connectivity with the pixel (i,j).

2. The method of claim 1, further comprising:
examining sub-blobs of pixels within the image; and
performing sub-blob connectivity analysis.

3. The method of claim 2, further comprising:
identifying and classifying edges of pixels within the image;
performing filling to further classify pixels within the image;
performing consistency analysis of pixels within the image;
performing pixel connectivity analysis of pixels within the image; and
identifying text pixels within the image.

4. The method of claim 2, wherein the step of examining sub-blobs of pixels within the image comprises:
examining each sub-blob to determine whether it is NON TEXT.

5. The method of claim 1, further comprising performing color space conversion of the image.

6. The method of claim 1, further comprising smoothing the image.

7. The method of claim 1, wherein a Gaussian lowpass filter is applied to the image, the filter being $$f_{i,j} = k e^{-\alpha^2 [(i-c)^2 + (j-c)^2]/c^2}$$

where k is a normalizing factor such that $$\sum_{i,j} f_{i,j} = 1.0,$$

c is the center of the filter and $\beta = 1.0$.

8. The method of claim 3, wherein the step of identifying and classifying edges of pixels within the image further comprises, classifying every pixel as NON EDGE, WHITE EDGE or BLACK EDGE.

9. The method of claim 8, wherein the step of identifying and classifying edges of pixels within the image further comprises:

(1) calculating a vertical gradient $G_{i,j}^I$, a horizontal gradient $G_{i,j}^J$, and the magnitude of gradient $M_{i,j}$ using the formula, $$G_{i,j}^I = (y_{i+1,j-1} + 2y_{i+1,j} + y_{i+1,j+1}) - (y_{i-1,j-1} + 2y_{i-1,j} + y_{i-1,j+1})$$

$$G_{i,j}^J = (y_{i+1,j+1} + 2y_{i,j+1} + y_{i-1,j+1}) - (y_{i+1,j-1} + 2y_{i,j-1} + y_{i-1,j-1})$$

$$M_{i,j} = \sqrt{(G_{i,j}^I)^2 + (G_{i,j}^J)^2}$$

Where $y_{i,j}$ is a pixel luminance value at an index i,j (2) calculating a discrete Laplacian (a second directive):

$$L_{i,j} = (y_{i-2,j} + y_{i+2,j}, y_{i,j-2} + y_{i,j+2}) - 4y_{i,j}$$

(3) classifying every pixel as the following:

```
If M_{i,j} > T_e then
    If L_{i,j} < 0
        Classify pixel at (i,j) as WHITE EDGE
    Else
        Classify pixel at (i,j) as BLACK EDGE
    Endif
Else
    Classify pixel at (i,j) as NON EDGE
Endif.
```

10. The method of claim 1, wherein the step of performing edge-bounded averaging further comprises:
starting from a first side of a line proceeding to a second side of the line identifying consecutive segments of pixels as NON EDGE, WHITE EDGE or BLACK EDGE.

11. The method of claim 1, wherein the step of performing edge-bounded averaging comprises:
computing the edge-bounded averaging for at least eight locations including both end points of a central interior, both end points of a left edge segment, both end points of a right edge segment, a right end point of a left interior and a left end point of a right interior.

12. The method of claim 11, further comprising:
classifying the central interior as NON TEXT, BLACK INTERIOR or WHITE INTERIOR based upon the edge-bounded averaging values.

13. The method of claim 3, wherein the step of performing filling to further classify pixels within the image comprises:
classifying segments as NON TEXT; and
examining segments classified as NON TEXT to determine whether they may be reclassified as BLACK INTERIOR, BLACK EDGE, WHITE INTERIOR or WHITE EDGE.

14. The method of claim 3, wherein the step of performing vertical consistency analysis of pixels within the image comprises:
examining pixels not yet classified as NON TEXT to determine whether they are BLACK INTERIOR, BLACK EDGE, WHITE INTERIOR or WHITE EDGE.

15. The method of claim 3, wherein the step of performing pixel connectivity analysis of pixels within the image comprises:
identifying aggregates of pixels having been identified as candidates for text, the aggregates being sub-blobs; and collecting statistics with respect to each sub-blob, wherein said statistics are selected from the group consisting of total number of pixels, sums of color values, number of border pixels, number of broken border pixels and horizontal run length.

16. The method of claim 3, wherein the step of identifying text pixels comprises:

examining each sub-blob to classify each pixel as either a text pixel or a non-text pixel.

17. A system for identifying text-like pixels from an image, the system comprising:

a processor for classifying a plurality of individual pixels within a mask within the image as either edge or non-edge, wherein a pixel (i,j) is located at the center of the mask; determining whether the pixel (i,j) is an edge pixel or a non-edge pixel; determining pixels in the mask having connectivity with the pixel (i,j); for each pixel in the mask determined to have connectivity with the pixel (i,j), determining whether the pixel is an edge pixel or a non-edge pixels and performing edge-bounded averaging to determine line segments, wherein the edge-bounded averaging comprises one of in response to determining that pixel (i,j) is an edge pixel, identifying all pixels in the mask that are edge pixels and that have connectivity with the pixel (i,j) from the determining of whether each pixel having connectivity is an edge pixel or a non-edge pixel, and determining an average value of only all the identified edge pixels in the mask having connectivity with the pixel (i,j), or in response to determining that pixel (i,j) is a non-edge identifying all pixels in the mask that are non-edge pixels and that have connectivity with the pixel (i,j) from the determining of whether each pixel having connectivity is an edge pixel or a non-edge pixel, and determining an average value of only all the identified non-edge pixels in the mask having connectivity with the pixel (i,j).

18. The system of claim 17, wherein the processor also examines sub-blobs of pixels within the image; and performs sub-blob connectivity analysis.

19. The system of claim 18, wherein the processor also identifies and classifies edges of pixels within the image; performs vertical filling to further classify pixels within the image; performs vertical consistency analysis of pixels within the image; performs pixel connectivity analysis of pixels within the image; and identifies text pixels.

20. A non-transitory computer readable storage medium on which is embedded one or more computer programs comprising a set of instructions that when executed by a processing circuit performs a method of processing a digital image, the method comprising:

classifying a plurality of individual pixels within a mask within the digital image as either edge or non-edge, wherein a pixel (i,j) is located at the center of the mask;

determining whether the pixel (i,j) is an edge pixel or a non-edge pixel;

determining pixels in the mask having connectivity with the pixel (i,j);

for each pixel in the mask determined to have connectivity with the pixel (i,j), determining whether the pixel is an edge pixel or a non-edge pixel; and performing, by a computer, edge-bounded averaging to determine line segments, wherein the edge-bounded averaging comprises one of in response to determining that pixel (i,j) is an edge pixel, identifying all pixels in the mask that are edge pixels and that have connectivity with the pixel (i,j) from the determining of whether each pixel having connectivity is an edge pixel or a non-edge pixel, and determining an average value of only all the identified edge pixels in the mask having connectivity with the pixel (i,j), or in response to determining that pixel (i,j) is a non-edge pixel, identifying all pixels in the mask that are non-edge pixels and that have connectivity with the pixel (i,j) from the determining of whether each pixel having connectivity is an edge pixel or a non-edge pixel, and determining an average value of only all the identified non-edge pixels in the mask having connectivity with the pixel (i,j).

21. The non-transitory computer readable storage medium according to claim 20, said one or more computer programs further comprising a set of instructions for:

performing pixel connectivity analysis of pixels within the digital image identifying aggregates of pixels having been identified as candidates for text, the aggregates being sub-blobs;

collecting each sub-blobs statistics: total number of pixels, sums of color values, number of border pixels, number of broken border pixels and horizontal run length; and counting sums of each luminance and chroma.

22. The non-transitory computer readable storage medium according to claim 20, said one or more computer programs further comprising a set of instructions for:

performing pixel connectivity analysis of pixels within the digital image by identifying aggregates of pixels having been identified as candidates for text, the aggregates being sub-blobs;

collecting each sub-blobs statistics: total number of pixels, sums of color values, number of border pixels, number of broken border pixels and horizontal run length; and counting sums of each Y, $C_r$, $C_b$.

* * * * *

UNITED STATES PATENT AND TRADEMARK OFFICE
CERTIFICATE OF CORRECTION

PATENT NO. : 8,103,104 B2
APPLICATION NO. : 10/044558
DATED : January 24, 2012
INVENTOR(S) : Jian Fan It is certified that error appears in the above-identified patent and that said Letters Patent is hereby corrected as shown below:

In column 13, line 64, in Claim 7, delete "$\beta=1.0$." and insert -- $\alpha=1.0$. --, therefor.

In column 14, line 20, in Claim 9, delete "$L_{i,j}=(y_{i-2,j}+y_{i+2,j}y_{i,j-2}+y_{i,j+2})-4y_{i,j}$" and insert -- $L_{i,j}=(y_{i-2,j}+y_{i+2,j}+y_{i,j-2}+y_{i,j+2})-4y_{i,j}$ --, therefor.

In column 15, line 33, in Claim 17, delete "non-edge" and insert -- non-edge pixel, --, therefor.

Signed and Sealed this
Thirtieth Day of October, 2012

David J. Kappos
*Director of the United States Patent and Trademark Office*